(12) United States Patent
Ellsworth et al.

(10) Patent No.: US 10,404,975 B2
(45) Date of Patent: Sep. 3, 2019

(54) RETROREFLECTIVE LIGHT FIELD DISPLAY

(71) Applicant: Tilt Five Inc., Sunnyvale, CA (US)

(72) Inventors: Jeri J. Ellsworth, San Jose, CA (US); Ken Clements, Los Gatos, CA (US)

(73) Assignee: Tilt Five, Inc, San Jose, CA (US)

( * ) Notice: Subject to any disclaimer, the term of this patent is extended or adjusted under 35 U.S.C. 154(b) by 364 days.

(21) Appl. No.: 15/074,525

(22) Filed: Mar. 18, 2016

(65) Prior Publication Data

US 2016/0277725 A1 Sep. 22, 2016

Related U.S. Application Data

(60) Provisional application No. 62/135,905, filed on Mar. 20, 2015.

(51) Int. Cl.
*H04N 13/344* (2018.01)
*G02B 27/01* (2006.01)
*H04N 13/322* (2018.01)

(52) U.S. Cl.
CPC ......... *H04N 13/344* (2018.05); *G02B 27/017* (2013.01); *G02B 27/0172* (2013.01); *H04N 13/322* (2018.05); *G02B 2027/0127* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 4,059,346 A | 11/1977 | Levine | |
| 4,190,330 A | 2/1980 | Berreman | |
| 5,621,572 A | 4/1997 | Fergason | |
| 5,726,671 A | 10/1998 | Ansley et al. | |
| 6,147,805 A | 11/2000 | Fergason | |
| 6,312,129 B1 | 6/2001 | Sisodia et al. | |
| 6,329,965 B1* | 12/2001 | Lee | G02B 27/0176 345/8 |
| 6,369,954 B1 | 4/2002 | Berge | |
| 7,046,447 B2 | 5/2006 | Raber | |
| 7,119,965 B1* | 10/2006 | Rolland | G02B 27/0172 359/630 |
| 8,511,827 B2 | 8/2013 | Hua | |
| 8,625,200 B2* | 1/2014 | Smith | G02B 17/06 359/631 |

(Continued)

FOREIGN PATENT DOCUMENTS

JP 2010-1395575 6/2010
WO 92-18971 10/1992

OTHER PUBLICATIONS

International Search Report dated Sep. 12, 2016 from International Application No. PCT/US2016/023196.

(Continued)

*Primary Examiner* — Kate H Luo
(74) *Attorney, Agent, or Firm* — Ken Clements

(57) ABSTRACT

A projected head mounted display system is disclosed that projects images onto a retroreflective screen, which are then reflected back for view by a user. The projected head mounted display system displays computer generated images at multiple focal distances to simulate a light field so as to match eye accommodation to vergence.

19 Claims, 13 Drawing Sheets

(56) References Cited

U.S. PATENT DOCUMENTS

| | | | |
|---|---|---|---|
| 8,933,862 B2 | 1/2015 | Lapstun | |
| 8,950,867 B2 | 2/2015 | Macnamara | |
| 2003/0179157 A1 | 9/2003 | Stanton | |
| 2006/0050402 A1* | 3/2006 | Ito | G02B 3/14 359/666 |
| 2008/0198459 A1* | 8/2008 | Fergason | G02B 5/12 359/529 |
| 2011/0188116 A1* | 8/2011 | Ledentsov | G06T 19/006 359/479 |
| 2011/0221657 A1* | 9/2011 | Haddick | G02B 27/017 345/8 |
| 2012/0139897 A1* | 6/2012 | Butler | G06F 3/041 345/419 |
| 2012/0250152 A1 | 10/2012 | Larson | |
| 2013/0083291 A1 | 4/2013 | Smithwick et al. | |
| 2013/0258486 A1* | 10/2013 | Ionescu | G02B 27/0172 359/630 |
| 2013/0278631 A1* | 10/2013 | Border | G02B 27/017 345/633 |
| 2014/0035959 A1 | 2/2014 | Lapstun | |
| 2014/0063055 A1* | 3/2014 | Osterhout | G06F 3/005 345/633 |
| 2014/0253993 A1 | 9/2014 | Lapstun | |
| 2014/0267941 A1 | 9/2014 | Ellsworth | |
| 2014/0268360 A1 | 9/2014 | Ellsworth et al. | |
| 2014/0293434 A1* | 10/2014 | Cheng | G02B 27/225 359/630 |
| 2014/0340424 A1 | 11/2014 | Ellsworth | |

OTHER PUBLICATIONS

Written Opinion dated Sep. 12, 2016 from International Application No. PCT/US2016/023196.

Hua, Hong, et al. "Engineering of head-mounted projective displays." Applied Optics 39.22 (2000): 3814-3824.

Martinsa, Ricardo, et al. "Projection-based head-mounted displays for wearable computers." Proc. of SPIE vol. 5442. 2004.

Kuiper, Stein, and B. H. W. Hendriks. "Variable-focus liquid lens for miniature cameras." Applied physics letters 85.7 (2004): 1128-1130.

Shi, Haofei, Chunlei Du, and Xiangang Luo. "Focal length modulation based on a metallic slit surrounded with grooves in curved depths." Applied Physics Letters 91.9 (2007): 093111.

Kress, Bernard, and Thad Starner. "A review of head-mounted displays (HMD) technologies and applications for consumer electronics." SPIE Defense, Security, and Sensing. International Society for Optics and Photonics, 2013.

Hu, Xinda and Hua, Hong, "High-Resolution Optical See-through Multi-Focal Plane Head-Mounted Display Using Freeform Optics," Optical Society of America, Optics Express, vol. 22, No. 11, pp. 13896-13903 (2014).

Rolland, Jannick et al, "Multifocal planes head-mounted displays," Applied Optics, vol. 39, No. 19, pp. 3209-3215.

Hendriks, B. H. W., et al. "Electrowetting-based variable-focus lens for miniature systems." Optical review 12.3 (2005): 255-259.

Smith, Neil R., et al. "Fabrication and demonstration of electrowetting liquid lens arrays." Journal of Display Technology 5.11 (2009): 411-413.

* cited by examiner

RETROREFLECTIVE LIGHT FIELD DISPLAY

CROSS REFERENCE TO RELATED APPLICATIONS

The present application claims the benefit of U.S. provisional application 62/135,905 "Retroreflective Light Field Display" the contents of which are hereby incorporated by reference.

FIELD OF THE INVENTION

The current invention is related to the field of three dimensional displays of computer generated images, and specifically projected head mounted displays. More particularly, embodiments of the present invention are directed to a head mounted retroreflective light field display.

BACKGROUND OF THE INVENTION

A light field is a representation of light. To produce a light field, views are obtained for a collection of viewpoints. Thus, a light field contains a number of different images. The number of images that is required depends on the application.

Light field displays are used for the presentation of images to the eyes of the user that comprise a plurality of planes of focus such that the human viewer can see different images for different eye accommodation response. Generally, this is done to more closely match the vergence of the eyes (i.e., it fuses images of stereopsis) to the required internal deformation of the eye lens that controls focus accommodation.

A variety of techniques have been developed to create a plurality of planes of focus. For example, some heads up displays (HUDs) combine images from multiple LCD pixel arrays, such as the approach of Ellsworth described in US patent publication US 2004/0267941. However, conventional approaches to light field displays for augmented reality (AR) and virtual reality (VR) suffer from various problems and drawbacks. These include problems with brightness and other issues. Additionally, some of the approaches are more complicated and expensive than desired.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter.

One embodiment of the present invention is a projected head mounted display (PHMD) (also known in the prior art as a head mounted projected display or HMPD) in which the image projectors have a focal plane distance modulated to permit the focal plane to be adjusted in synchronization with image scenes to approximate a light field display for projected image returned to the PHMD from a retroreflective screen or retroreflective surface. The retroreflective screen or retroreflective surface may, for example, be a quasi phase conjugate reflector.

Another embodiment of the present invention is a method of operating a PHMD as light field image projectors. The retroreflective surfaces present multiple planes of focus to the eyes of the PHMD user, approximating a light field display. In one embodiment this is accomplished by modulation of the projection focal distance, taking advantage of the phase conjugate reflection property of the retroreflective surface to preserve the focal difference and present said plurality of focal plans to the eyes of the users.

Another embodiment of the present invention is a system having a PHMD. The PHMD has limited local processing and control functions. Computer generated images and synchronization of the modulation of the projection focal distance may be performed in a separate computing element having a CPU and a GPU.

Still yet another embodiment of the present invention comprises a retroreflective screen having at least one curved segment.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions of the implementations; however, the implementations are not limited to the specific methods and instrumentalities disclosed. Represented in the drawings.

DETAILED DESCRIPTION

Figure 1:
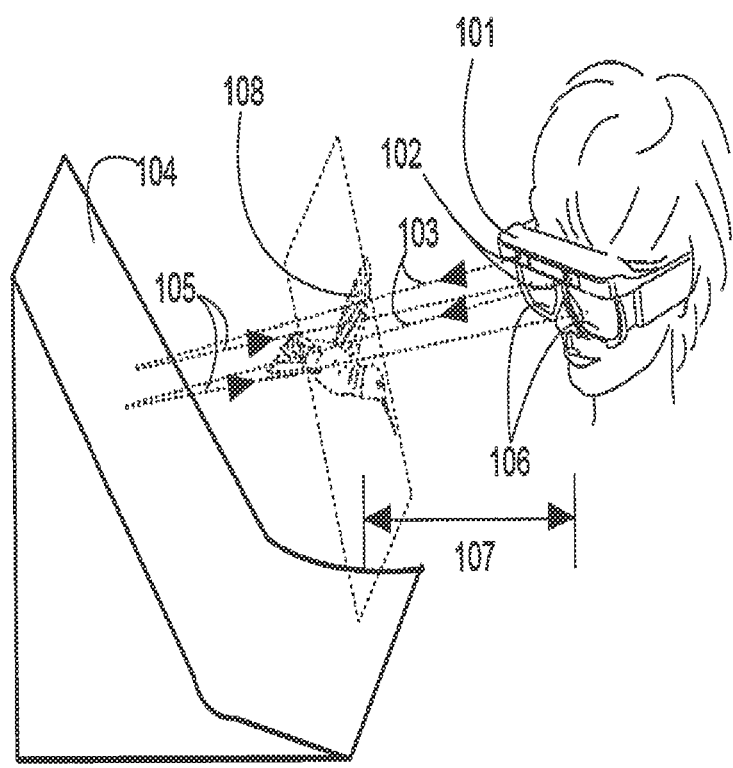
FIG. 1 illustrates a projected head mounted display system having a single focal plane for a retroreflected projected image in accordance with the prior art.

A PHMD system (such as described by Ellsworth US 2014/340,424) is shown in FIG. 1. In this system a head mounted frame 101 houses a pair of image projectors 102 that send projected rays 103 to be reflected by retroreflective screen 104. The returned image rays 105 are segregated to be seen by corresponding eyes by means of lenses 106, thus providing stereopsis. The retroreflective screen 104 is a quasi-phase conjugate screen. The phase conjugate optic property of retroreflective screen 104 causes the eyes of the user to accommodate to the distance 107 set by the projection focus of projectors 102 even though the distance to screen 104 may be more or less than the projection focal distance (FIG. 1 shows only a shorter distance for 107. A longer distance, not shown, would make the image 108 seem to be behind the screen 104, and shining through it).

Figure 2:
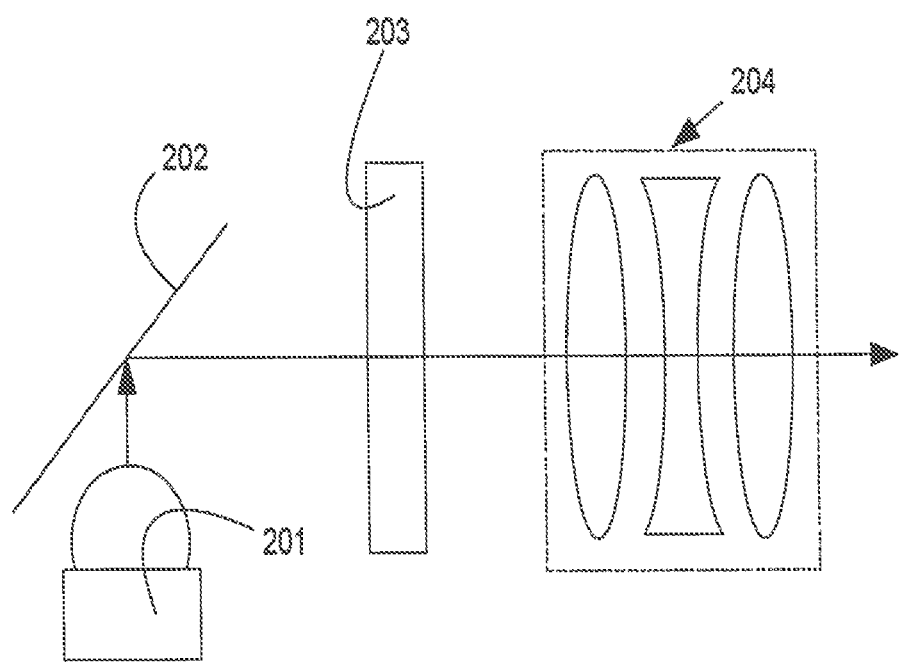
FIG. 2 illustrates an optical path of one of the image projectors from FIG. 1 in accordance with the prior art.

In FIG. 2, a simplified optical path of a typical prior art image projector of a PHMD of FIG. 1 is shown in detail. In this image projector device, a light source 201 is directed by mirror 202 through a spatial light modulator 203 and then the image produced by 203 is projected to an external focal plane by projection lens system 204. This arrangement is shown for simple reference, but there exist many other arrangements using other types of light sources and spatial light modulators.

Figure 3:
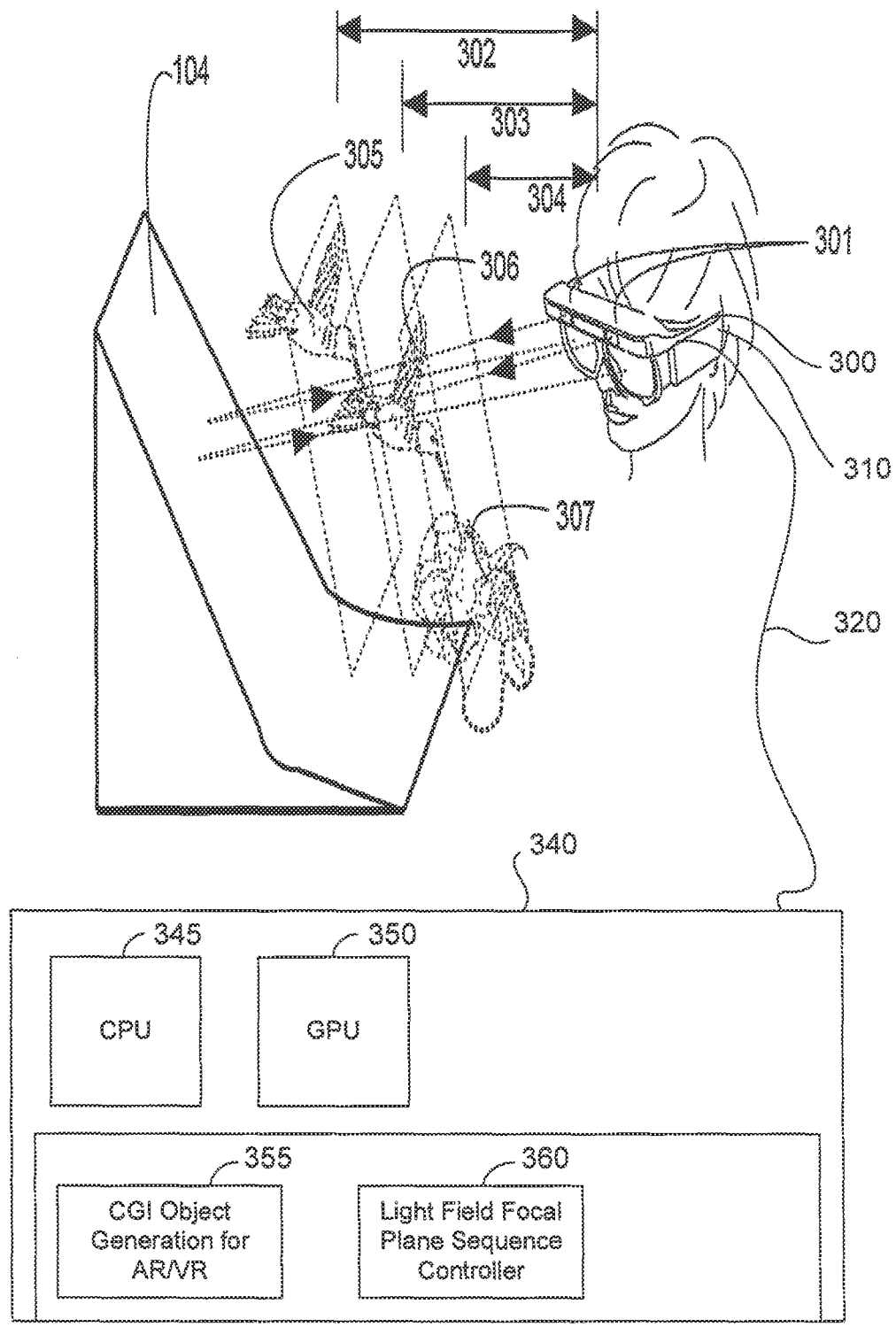
FIG. 3 illustrates an embodiment of a projected head mounted display system having multiple focal planes of retroreflected projected images simulating a light field.

Some aspects of an embodiment of the present invention are illustrated in FIG. 3, which illustrates an embodiment in which the pair of image projectors 301 of a PHMD 300 with a frame 310 are modified to be variable focal distance image projectors capable of modulation of focal distances 302, 303 and 304. In this example, the image seen by the user comprises three different images that are presented sequentially on three different focal planes, but at a fast enough sequence to appear to be simultaneous to a human user. The selection of the focal plane distances and the rate of the sequence is selected to match the visual distances images are to be presented to a user at a rate sufficient to merge images in the user's visual perception. There are some general perceptual studies of how the human eye and brain perceive a sequence of images that can be used to set general limits on the sequence rate needed to appear to be simultaneous to a user. However, more generally empirical studies can be used to select a sufficiently fast enough sequence for the sequence to appear to be simultaneous to a user.

Because of the phase conjugate optic property of the retroreflective screen 104 the user viewing this display will be able to focus on each of the three planes with different eye accommodation strengths. With proper scene construction software, the computer generated images 305, 306 and 307 (CGI) shown will match in stereopsis the modulated focal distance, and thus provide the accommodation to vergence, matching the benefits of a light field display. The vergence may be a measured eye vergence or a predicted eye vergence.

As previously discussed, the light field may be simulated by a collection of focal planes at different distances. In this example, two-to-three focal planes is a minimum to provide accommodation to vergence. However, more generally, the number of focal planes may be selected to simulate a light field for a given set of viewing conditions. In some applications, multiple focal planes may be selected. The focal distances may be stepped to have a sequence of focal planes simulating a light field. As an example, a computing element 340, which may be an external computer, includes a central processing unit (CPU) 345, graphics processing unit (GPU) 350, and memory storing software to support computer generated image (CGI) generation 355 for augmented reality or virtual reality applications. If an external computer is used, a wired 320 or wireless link may be used to communicatively couple computing element 340 with the PHMD. Alternatively, the computing element 340 may be integrated into the PHMD 300.

A focal plane sequence controller 360 may be provided to step the focal plane distance in a sequence of steps for each visual image scene. The control of the focal plane distance is performed in synchronization with the CGI generation of images, such as on a frame-by-frame basis. Additionally, the stepping of the focal plane distance takes into account the response of the variable focal distance image projectors 301 and the phase conjugate response of the retroreflective surface 104. The result is a collection of focal planes at different distances that approximates or simulates a light field.

Additionally, other aspects of the viewing environment and the human eye-response may be taken into account in selecting a sufficient number of focal planes to simulate a light field. For example, calibration tests may be used to determine how many focal planes are required for a given set of viewing conditions to achieve the accommodation to vergence matching the benefits of a light field display.

Figure 4A:
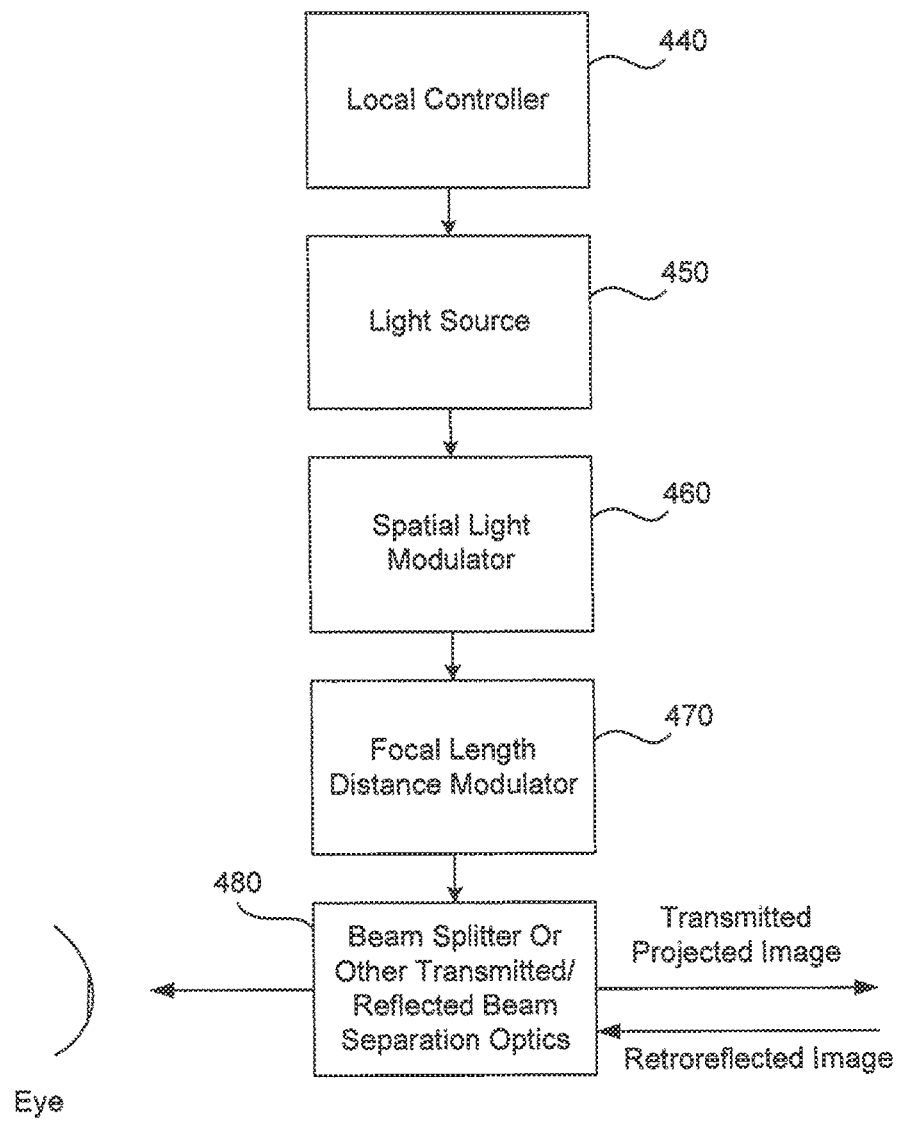
FIG. 4A is a block diagram of an embodiment of an image projector with focal plane modulation.
Figure 4B:
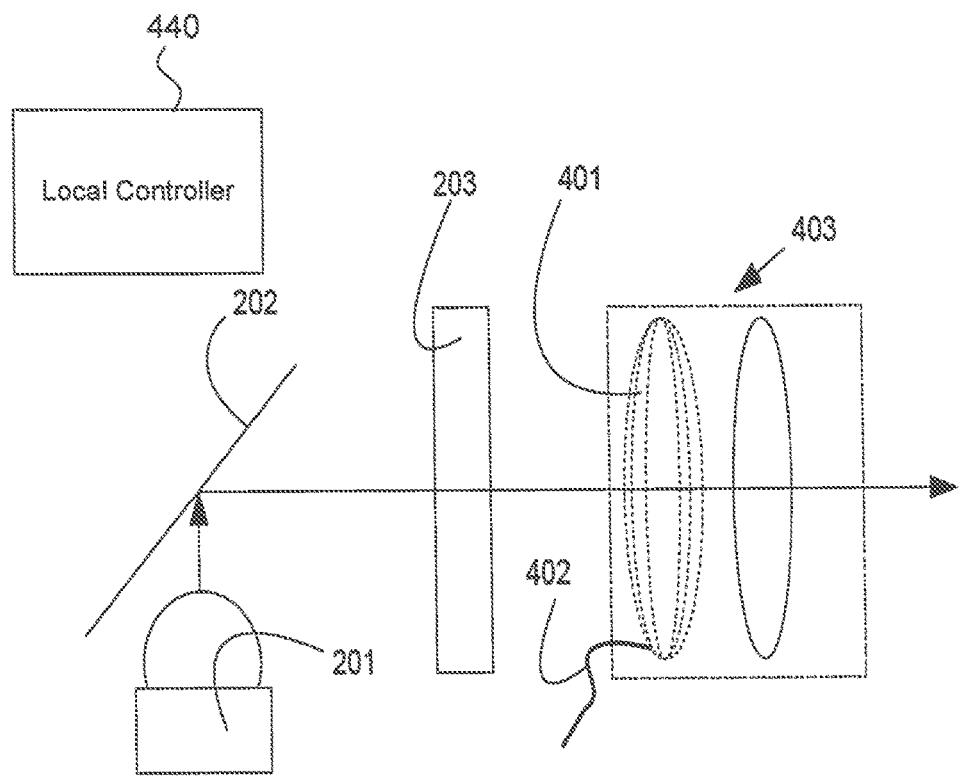
FIG. 4B illustrates an embodiment showing an optical path of an image projector with focus modulation.

Embodiments of a variable focal distance image projector 301 is shown in FIGS. 4A and 4B, which would be understood to be mounted to or within a frame of the PHMD. The focal distance is modulated using one or more components to module the focal distance of a projected image.

In the embodiment of FIG. 4A, an optional local controller 440 may be provided to manage operation of local components. The local controller 440 may, for example comprise an electrical circuit, processor, or a microprocessor controller. A light source 450 and spatial light modulator 460 are provided. A focal length distance modulator 470, which includes one or more electrically adjustable optical components to adjust the focal length in response to an electrical control signal, is provided. The transmitted projected image travels out to the retroreflective screen. The retroreflective image returns and is provided to the eye of the user, such as via a beam splitter or other optics 480 used in the art to direct the reflected image to the user's eye after it returns to the PHMD.

FIG. 4B illustrates the arrangement of FIG. 2 modified by the insertion of an adjustable lens, such as a deformable lens 401 in the projection lens system. In one embodiment an electrowetting lens is chosen such that an electrical signal 402 can be applied to lens 401 causing a change to its focal length. The change in focal length of lens 401 causes a corresponding change of the distance to the focal plane of the image projected, as is commonly known in the projector art. In operation the signal 402 would be changed in a sequence to match images sent to the spatial light modulator 203 so as to stabilize the lens 401 at each selected focal length before a flash of the light source sends a partial image to be presented at the corresponding focus distance. When multicolor projection is by means of sequential primary colors, the suppression of chromatic aberration of conventional projection lens systems may also be simplified (as shown by removal of the chromatic aberration correction lens from lens system 403) or moved to software by correction in the focal length modulating signal.

Although an embodiment using an electrically deformable lens has been illustrated in FIG. 4B, those skilled in the art will understand that the modulation of the focal distance may be achieved using other adjustable optical components. As one example, a motorized lens may be used. For example, a micro-motor or micro-actuator may be used implement a motorized lens in which the effective position of a lens is adjusted relative to other optical components. Another option is a deformable mirror. For example, there are a variety of mirrors and micro-mirror arrays in which the mirror is deformable in response to an electrical signal.

There are also lenses with an electrically modulatable index of refraction. Additionally there are electrically modulatable diffraction elements and or other controlled optics means known in the art. Additionally compound systems that have two or more adjustable elements to control the focal distance may be employed. Also, while three focal planes have been shown for example, those of ordinary skill in the art will understand that the number of planes may be two, or may be larger than three. The optical path in this embodiment has been shown without the usual beam splitters (see U.S. Pat. No. 6,147,805) that would result in a more direct return path to the eyes. However embodiments of the invention may as well be embodied using said beam splitters.

It will also be understood that the local controller 440 may be provided to aid in managing the operation of the variable focal distance image projector. For example, a local control may include calibration data and/or conversion tables to aid in converting commands to adjust a focal plane distance to instructions to control optically adjustable elements. The local controller may, for example comprise a processor or dedicated hardware.

Figure 5A:
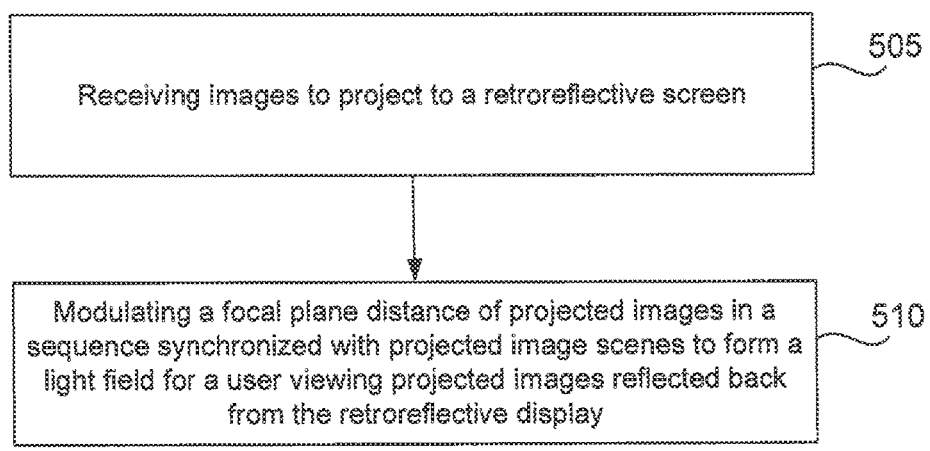
FIG. 5A is a flow chart of an embodiment of a method of operation of an image projector.

FIG. 5A is a flow chart illustrating a general method of operating a PHMD with variable focal distance image projectors to approximate a light field display. The variable focal distance image projectors receive 505 images to project to a retroreflective screen. The focal plane distance of the projected images is modulated 510 in a sequence synchronized with projected image scenes to approximate a light field display for a user of the PHMD viewing projected imaged reflected back from the retroreflective screen.

Figure 5B:
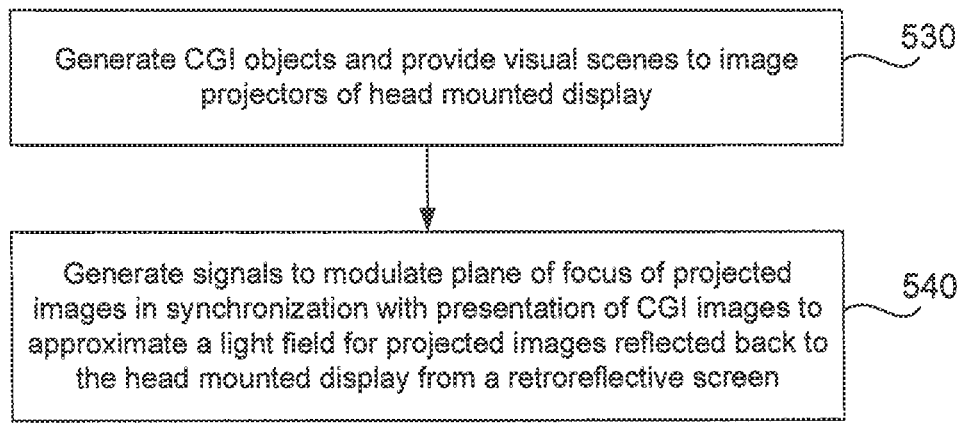
FIG. 5B is a flowchart of an embodiment of a method for a computing element to generate CGI objects and control signal for an image projector.

FIG. 5B is a flow chart illustrating a general method of generating CGI objects and control signals for the PHMD. CGI objects are generated 530 to provide visual scenes to the variable focal distance image projectors of the PHMD. Control signals 540 are generated to module the distance of the plane of focus of projected images in synchronization with the presentation for the CGI images to approximate a light field for projected images reflected back to the PHMD via a retroreflective screen.

Figure 5C:
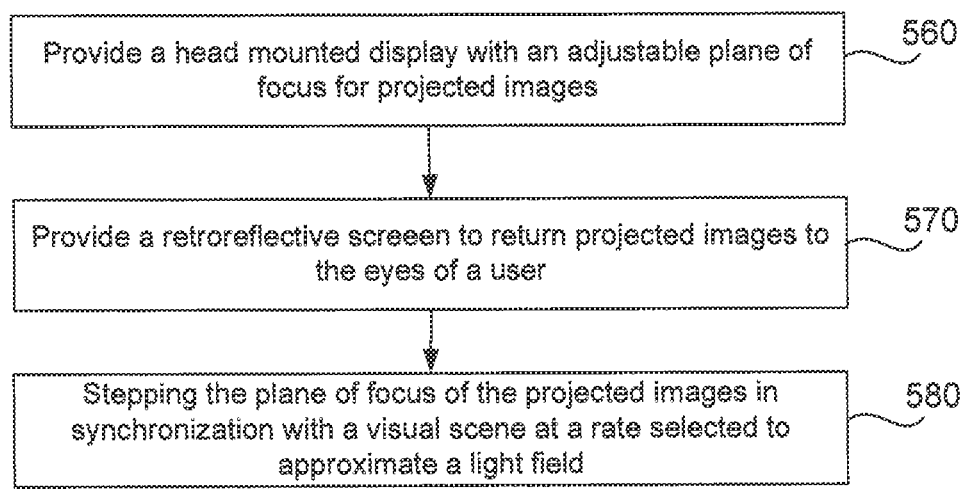
FIG. 5C is a flowchart of an embodiment of a method of operating a head mounted display system.

FIG. 5C is a flow chart illustrating a general method of operating a system in accordance with an embodiment of the present invention. A head mounted display with an adjustable plane of focus for projected images is provided 560. A retroreflective screen is provided 570 to return projected image to the eyes of the user of a PHMD. This may include, for example, providing a portable retroreflective screen or providing a room with one or more retroreflective surfaces. The plane of focus of the projected images is stepped in synchronization with a visual scene at a rate selected to approximate a light field 580.

Figure 6A:
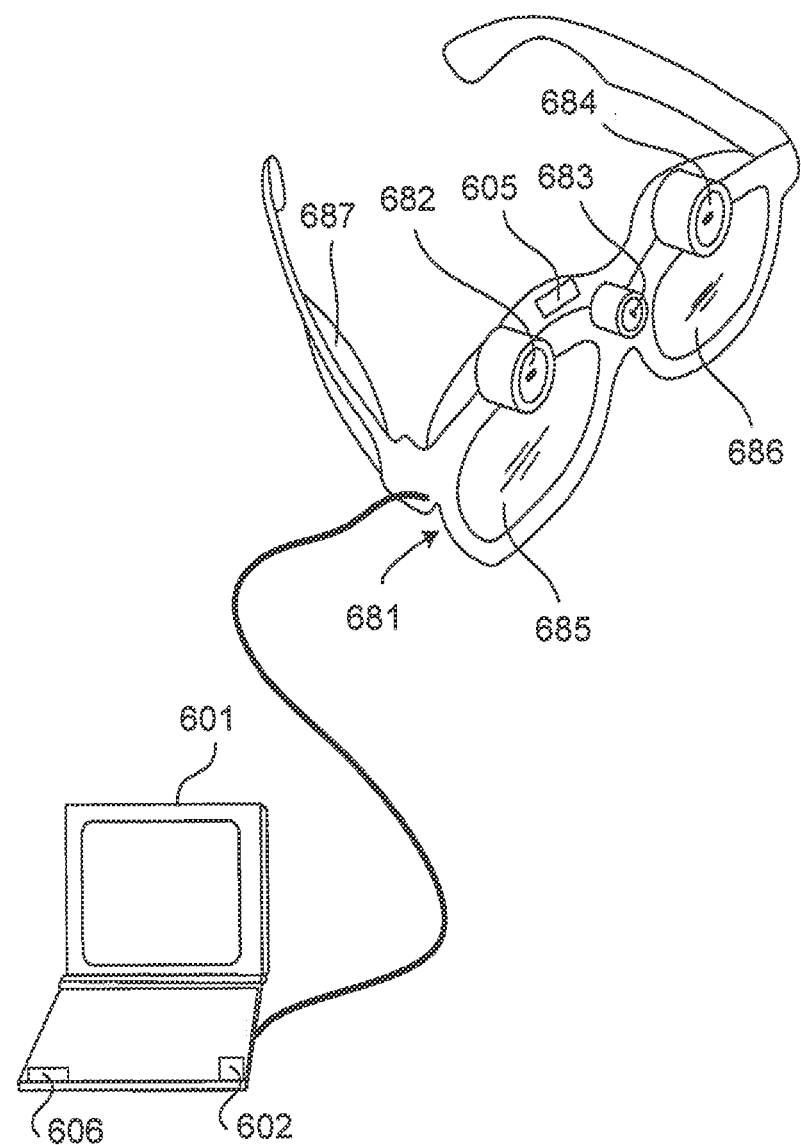
FIG. 6A illustrates a projected head mounted display system including a tracking module.

The PHMD may include tracking of the user's head or eye motion, which may then in turn be used in CGI image generation. Referring to FIG. 6A, in one embodiment the PHMD 681 includes a tracking module 683 to track the position of the user. The tracking module 683 may be mounted to a portion of the frame 687 along with one or more image projectors 682, 684 and polarizing lenses 685, 686, and control electronics 605 in the PHMD. A computer 601 with a CPU 606 and GPU 602 may be used to generate images for the PHMD and receive the tracking data from the tracking module 683.

The tracking module 683 may perform tracking and range finding to determine, for example a distance to the retroreflective screen and the position of the user's head. The tracking of the user's head and or eye tracking means, and rendering software, permits the production of images of CGI objects with focal depth and perceptual presence. Furthermore, cameras and range finding in the tracking module facilitates software analysis of the shapes and positions, etc., of real objects in view, so as to mix CGI objects at corresponding focal plane distances with real objects in what is known in the art as "mixed reality." In particular, the tracking data may be provided to be used during CGI image generation to generate augmented reality images on a plurality of focal planes. In augmented reality, a user has a view of real objects and the retroreflected projected images provide the augmented reality.

Figure 6B:
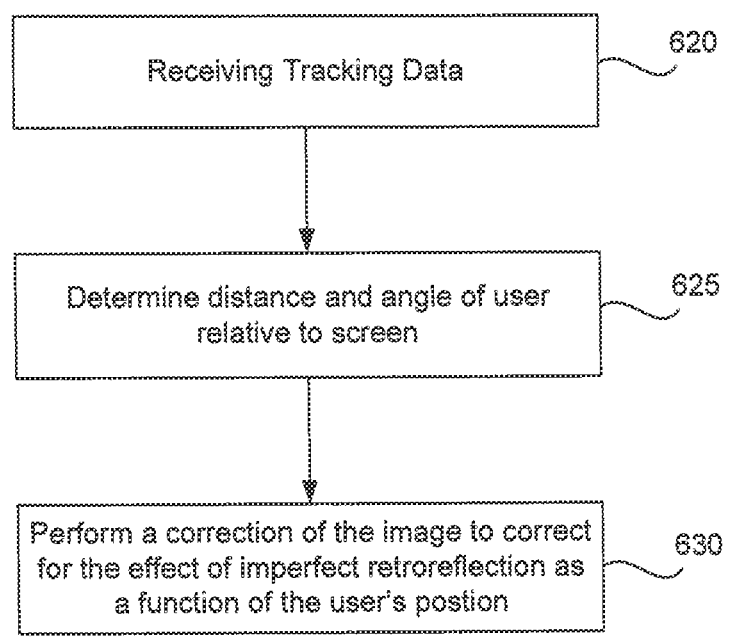
FIG. 6B illustrates an embodiment of a method of using tracking data to perform adjustments to correct for imperfect retroreflection.

In one embodiment corrections are performed to adapt the response of the PHMD to imperfect retroreflection. Referring to FIG. 6B, in one embodiment the tracking data from the tracking module is received 620. The tracking data is used to determine 625 the distance and angle of the user relative to the retroreflective screen. In turn, the determined distance and angle is used to correct the image generation. This may include correction performed to correct for imperfect retroreflection.

In a perfect retroreflector, light strikes the retroreflector and goes straight back to its source in a converging cone, regardless of the angle of incidence or distance from the source. For example if a flat retroreflective screen were "perfect" in theory it wouldn't matter what angle the projected light struck the screen; it would always return back on the same path that it traveled out and would converge in exactly the same way. However in practice, there is imperfect retroreflection in most commercially available retroreflective materials. Thus, in practice there can be angular effects to take into account regarding how the image converges back as it returns to the source. There can also be some scattering. The retroreflective screen may thus be a quasi-phase conjugate reflector and not an ideal phase conjugate reflector. Moreover, there may be slight angular offset in the optical alignment of optical components in the PHMD relative to the retroreflective screen, particularly when the user changes the position of his or her head. Additionally, even under near ideal conditions, the optical components may also have slight angular imperfections. Thus, even under near ideal conditions, the angular offset may be anywhere between a fraction of a degree to about two degrees in some cases.

In one embodiment, a head tracking system monitors the position of the user's head or eyes. The head tracking system may be implemented within the PHMD as a tracking module 683 or be an external tracking system. The tracking system is used to measure the distance to the screen and the angle that the projected beams hit it. The parameters in the projection matrices used by a CGI rendering engine are adapted during CGI object generation to keep the virtual object from changing perceived size based on angle and distance. Thus the tracking data is used to perform corrections in the CGI object generation to account for imperfect retroreflection. As an example, suppose the user begins with his or her head looking straight at the screen. At some later time, suppose the user rotates his or her head by a few degrees. The CGI object generation is then adapted to account for the imperfect retroreflection caused by the rotation of the user's head.

In one embodiment, calibration data is collected during a test phase to determine corrections to the CGI projection matrices as a function of tracking data. Additionally, the calibration data may be used to calculate any additional correction to the stepping of the focal plane distance required to maintain synchronous operation with the CGI images.

Figure 7A:
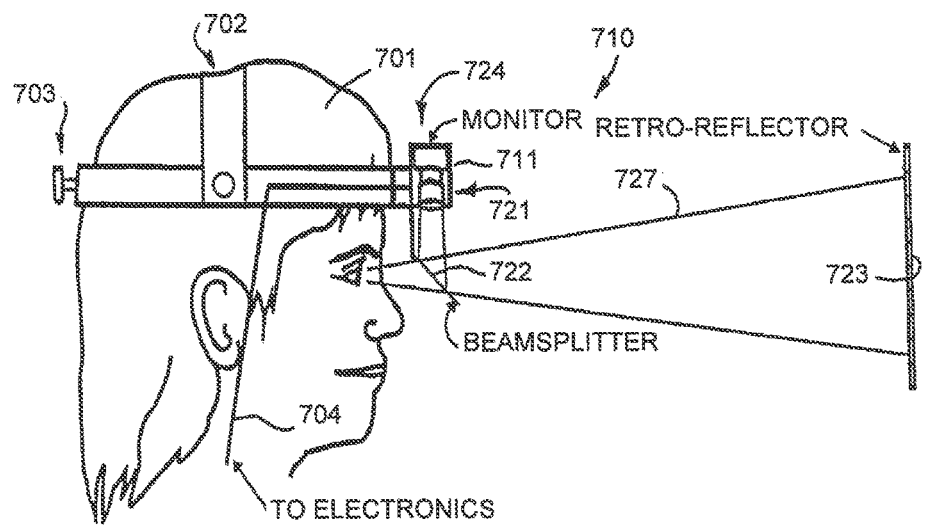
FIGS. 7A and 7B illustrate a prior art retro-reflective screen geometry having a flat retroreflective screen.
Figure 7B:
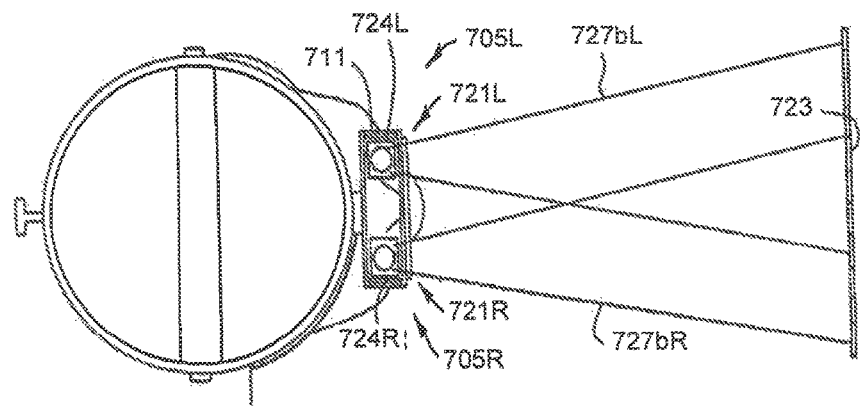
Figure 7C:
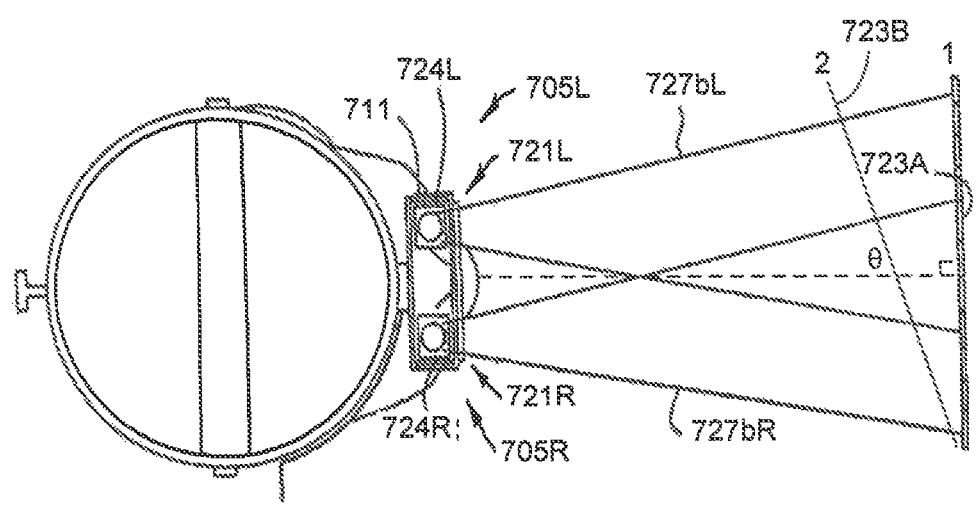
FIG. 7C illustrates the case where the user's head is rotated relative to the screen.

In one embodiment, the retroreflective screen has a shape selected to minimize problems of imperfect retroreflection. One approach in the prior art of U.S. Pat. No. 6,147,805 is use to flat retroreflective screen 723, as illustrated in FIGS. 7A and 7B. FIG. 7A illustrates a side view Referring to FIG. 7A, headgear 702 on a user's head 701 supports a housing 711, which includes focusing optics 721, and image sources 724 that are part of image projectors 705. An electrical cable 704 is provided to provide a communication link with external electronics. There is a flat retroreflective screen 723 and light returns to the PHMD via a beam splitter 722. FIG. 7B illustrates a top view which shows left (L) and right (R) image projectors 705R and 705L. Each projector, in turn emits a corresponding cone of light 727bL and 727bR. One problem with the arrangement of FIGS. 7A and 7B is that if it does not take into account imperfections in the retroreflective screen 723. In practice, the retroreflector is imperfect and any significant changes in the angle of the user's head 701 with respect to the screen 723 are exacerbated when the user shifts the position of his or her head. FIG. 7A illustrates the user facing the retroreflective screen head-on such that the entry angle is 90 degrees. However, suppose the user in FIG. 7B rotates his or her head. This will have the effect of changing the angle with which the light strikes the imperfect retroreflector. In particular, if the user rotates his or her head the entry angle with respect to the screen will no longer be 90 degrees. This is illustrated in FIG. 7C, which shows the angle of incidence change as the user rotates their head. In a first position the screen 723A is head on such that the entry angle is ninety degrees. In a second position the screen 723B is oriented such that the entry angle is no longer ninety degrees. If the retroreflective screen 723 was perfect, the fact that the entry angle is no longer ninety degrees would not matter. However, the inventors of the present application recognized that for non-ideal retroreflective screens changes in entry angle away from 90 degrees can have significant effects on operation of a PHMD.

Figure 8:
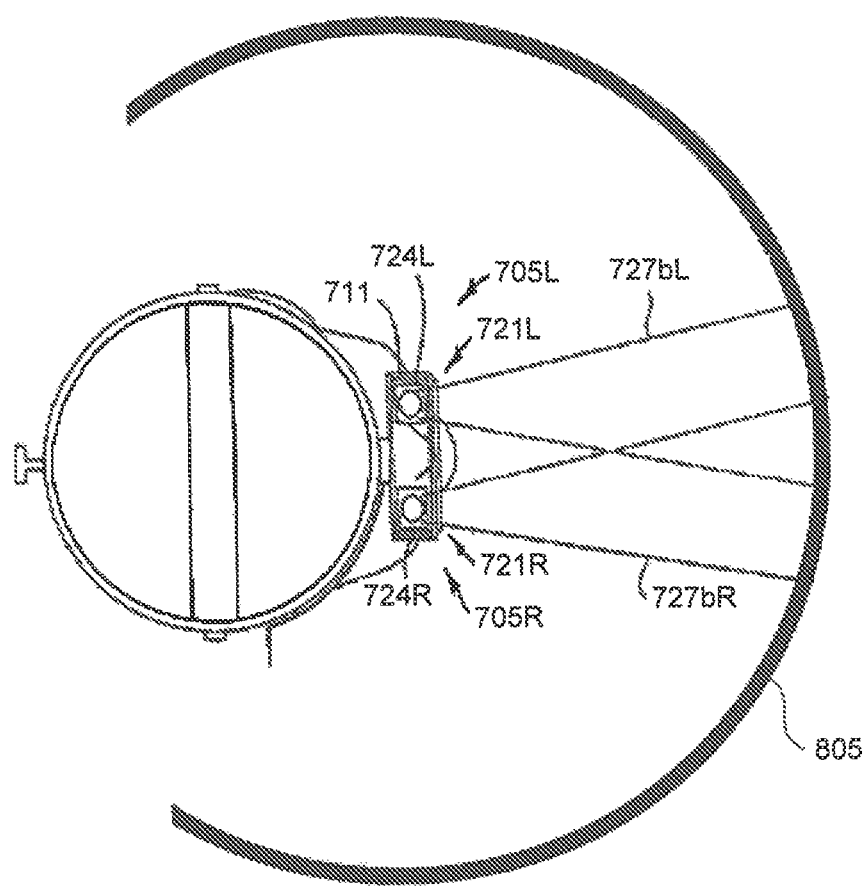
FIG. 8 illustrates an embodiment of a projected head mounted display system having a curved retro-reflective screen.

Referring to FIG. 8, in one embodiment a retroreflective screen 805 has a curved shape to minimize problems of imperfect retroreflection. In this example, the retroreflective screen is curved in an arc around the user such that rays of light will mostly have a 90 degree entry angle and reflect straight back. The length of the arc may be selected to maintain a 90 degree entry angle over some range of user rotation. For example, a particular game application may include a range of possible user rotation with a first range, such a range of ten degrees. However, in an immersive game environment, a larger range, such as range of 180 degrees or greater may be desired.

As illustrative examples, the retroreflective screen may be a cylinder-shape extending partially or fully around the user. The extent that the cylinder shape extends around the user determines a range of angles the user can rotate and maintain a 90 degree entry angle.

As another example, the retroreflective screen may be a part or all of a spherical shell. For example, suppose in a game application that a user is standing at a given location. The extent of the spherical shell may be selected to support a selected range of rotation axially and azimuthally.

It will be understood that the curved shape does not have to be a perfectly smooth curve. An approximation of a cylinder or sphere may be sufficient to partially compensate for imperfect retroreflection. For example, a sphere can be approximated by a geodesic pattern based on triangles. Additionally, it will be understood that other compromises are possible. For example, a retroreflective screen could have a flat center portion and curved sides as a compromise between function and space limitations. Moreover, when a compromise is made between function and other limitations, it will be understood that the curved segments may not necessarily achieve precisely 90 degree angle of incidence. For example, the curvature may be selected on some other basis, such as minimizing errors caused by imperfect retroreflection over a range of user movement subject to a constraint on the retroreflector shape, such as a maximum depth between and edge and center of a retroreflector screen.

While examples have been provided with a pair of image projectors, it will be understood that more generally variations are contemplated having a single image projector.

An illustrative embodiment has been described by way of example herein. Those skilled in the art will understand, however, that change and modifications may be made to this embodiment without departing from the true scope and spirit of the elements, products, and methods to which the embodiment is directed, which is defined by our claims.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Additional AR and VR Implementations

Examples have been illustrated having augmented reality (AR) glasses. However, extensions and modification of the glasses are possible. For example, the image projectors and any tracking modules may be implemented as a sub-assembly that is mountable/demountable on a set of glasses. For example, the sub-assembly may be implemented as a clip-on or screw-on sub-assembly that fits onto a set of glasses. That is, it will be understood that the image projectors may be implemented as a sub-assembly which may further optionally include a tracking module. An even larger sub-assembly, including other elements of the AR glasses such as the eyepiece lens components, may be implemented to clip on or screw onto a set of glass frames. There are a variety of applications in which it may be desirable to provide a mountable sub-assembly rather than the entire set of AR glasses. Having a mountable sub-assembly provides potential advantages in hygiene (since users can share the mountable/demountable sub-assembly and have their own separate set of glasses or frames). Having a mountable/demountable sub-assembly also provides options for end users to break down AR glasses into smaller components for transit, or to swap out components during extended user. It will thus be understood that any of the previously described embodiments may be implemented using mountable/demountable sub-assemblies.

It will also be understand that many components may be made more compact and integrated into compact optical assemblies. For example, in one embodiment the retroreflectors are placed within an optical sub-assembly capable of being mounted to or otherwise attached to the glasses. One application of this is for use in Virtual Reality (VR) type glasses that are enclosed. For example, instead of having an exterior retroreflective screen located some distance away from the user, optical techniques may be used to place the retroreflective screen close to the user's eyes. For example, Fergason in U.S. Pat. No. 5,621,572 describes an optical assembly having lenses and a beam splitter to place the retroreflective screen comparatively close to the eye of the user. The size of such optical assemblies can be fairly compact and within the size constraints of VR type enclosed glasses such that the optical assemblies (with retoreflective screens) may be attached to or built into VR-type glasses. Thus, it will be understood that the previous examples may be implemented for compact optical assemblies having retroreflective screens and other optics (e.g., beam splitters and lenses) to project the projected image onto the retroreflective screens and then onto the eye of the user.

Combinations and Sub-Combinations

Various embodiments of PHMDs have been described. It will be understood that the principle of generation a sequence of images at different focal planes to simulate a light field may be applied to the different embodiments. Moreover, in each case the number of focal plane distances is at least two (to provide accommodation) and the number of focal plane distances in a sequence may be selected to provide accommodation to vergence. The number of focal planes distances in a sequence may also be selected to simulate a light field. Moreover, the sequence of image may occur at a rate to merge images in the user's visual perception.

Additionally, it will be understood that the different embodiments of PHMDs illustrates with flat retroreflective screens may also be utilized with the embodiments having curved retroreflective screens.

Figure 9:
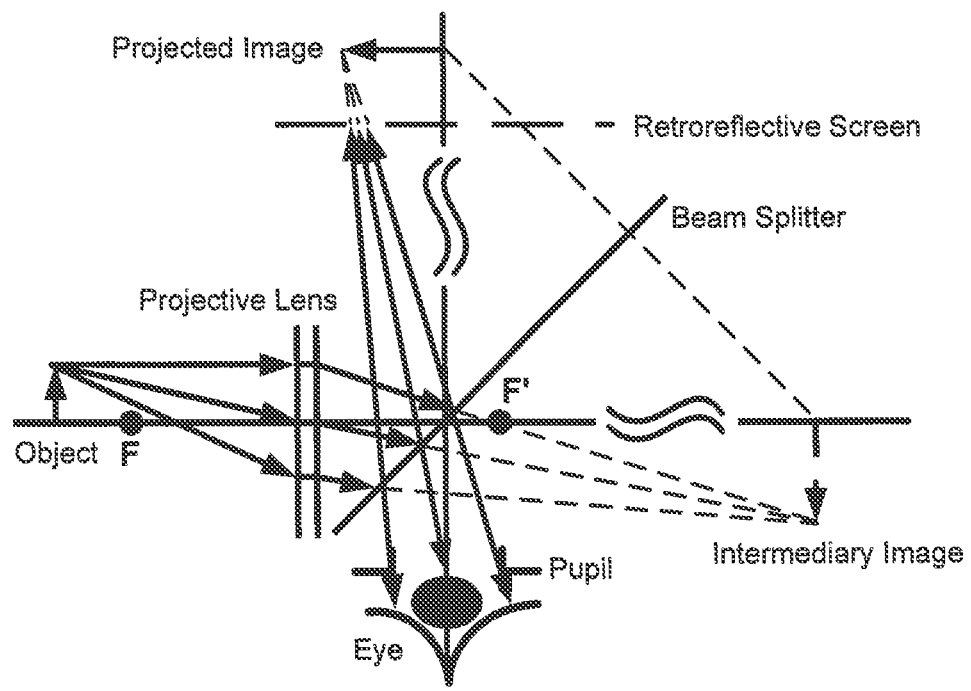
FIG. 9 illustrates a head mounted display.

Appendix I: Additional Background on use of Retroreflectors in Head Mounted Projection Displays Some aspects of Hua, Hong, et al. "Engineering of head-mounted projective displays." Applied Optics 39.22 (2000): 3814-3824 are now summarized. In particular, in an ideal retroreflective screen does not affect the image's size and position. Consequently, the size and position of retroreflected image are the same as that of the projected image FIG. 9 illustrates a HMPD of Fergason, U.S. Pat. No. 5,621,572. In this example, the final image is at least 25 cm away from the eyes to allow the user to accommodate. A HMPD utilizes a projection lens and a retroreflective screen.

Figure 10:
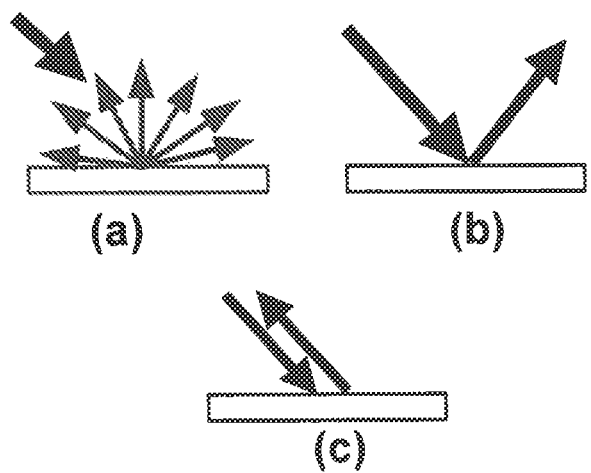
FIG. 10 illustrates aspects of a retroreflective screen.

The differences among a diffusing surface, a mirror surface, and a retroreflective surface are illustrated in FIG. 10. FIG. 10a illustrates a diffusing surface. FIG. 10b illustrates a reflective surface, and FIG. 10c illustrates a retroreflective surface.

A miniature display is located beyond the focal point of the lens to display computer-generated images. Through the projection lens, an intermediate image is formed. A beam splitter is placed after the projection lens at 45° with respect to the optical axis to bend the rays at 90°.

A retroreflective screen is located on either side of the projected image. Because of the special characteristics of retroreflective materials, the rays hitting the surface are reflected back upon themselves in the opposite direction toward the eye of the user. At the exit pupil of the optics, the user perceives a synthetic environment composed of virtual objects and real objects between himself and the retroreflective screen. Ideally, the location of a virtual object is independent of the location of the retroreflective screen. Moreover, the retroreflective property (of an ideal retroreflector) is independent of the incident angle.

For a given focal length, f, of the projection lens, the position and size of the projected image can be calculated. With binocular HMPD's the same imaging scheme is applied to each eye. Because an ideal retroreflective screen does not affect the image's size and position, the size and position of the retroreflected image are the same as those of the projected image.

Incorporation By Reference

Background information on light fields, multi-focal plane displays, head mounted displays using retroreflectors, and variable focal distance optical components are described in the following US patents, patent publications, and papers, which are each hereby incorporated by reference for all purposes:

U.S. Pat. No. 4,059,346
U.S. Pat. No. 4,190,330
U.S. Pat. No. 5,621,572
U.S. Pat. No. 6,147,805
U.S. Pat. No. 6,369,954
U.S. Pat. No. 7,046,447
U.S. Pat. No. 8,511,827
U.S. Pat. No. 8,933,862
U.S. Pat. No. 8,950,867
US 2012/0250152
US 2014/0035959
US 2014/0253993
US 2014/0267941
US 2014/0340424

Hua, Hong, et al. "Engineering of head-mounted projective displays." Applied Optics 39.22 (2000): 3814-3824.

Martinsa, Ricardo, et al. "Projection-based head-mounted displays for wearable computers." Proc. of SPIE Vol. Vol. 5442. 2004.

Kuiper, Stein, and B. H. W. Hendriks. "Variable-focus liquid lens for miniature cameras." Applied physics letters 85.7 (2004): 1128-1130.

Hendriks, B. H. W., et al. "Electrowetting-based variable-focus lens for miniature systems." Optical review 12.3 (2005): 255-259.

Shi, Haofei, Chunlei Du, and Xiangang Luo. "Focal length modulation based on a metallic slit surrounded with grooves in curved depths." Applied Physics Letters 91.9 (2007): 093111.

Smith, Neil R., et al. "Fabrication and demonstration of electrowetting liquid lens arrays." Journal of Display Technology 5.11 (2009): 411-413.

Kress, Bernard, and Thad Starner. "A review of head-mounted displays (HMD) technologies and applications for consumer electronics." SPIE Defense, Security, and Sensing. International Society for Optics and Photonics, 2013.

Hu, Xinda and Hua, Hong, "High-Resolution Optical See-through Multi-Focal Plane Head-Mounted Display Using Freeform Optics," Optical Society of America, Optics Express, Vol. 22, No. 11, pp 13896-13903 (2014).

Rolland, Jannick et al, "Multifocal planes head-mounted displays," Applied Optics, vol. 39, no. 19, pp3209-3215.

What is claimed is:

1. A projected head mounted display system comprising:
a head mounted frame including at least one image projector arranged to project images out of and forward away from, said frame, said projector or projectors having an adjustable projected focal plane distance; at least one controller to vary the focal plane distance of an image scene in a sequence selected to simulate a light field for projected images reflected back from a retroreflective screen or retroreflective surface; and a retroreflective screen or retroreflective surface having an effectively high ratio of retroreflected rays to diffused reflected rays so as to return to the eyes of the wearer of said projected head mounted display system, said projected images from said forward projecting image projector or projectors over said adjustable focal plane distance range of said image scene; wherein said head mounted display further comprises a tracking module to track the movement and position of a user and provide tracking data to a computing element to produce computer generated images (CGI) of objects having positions or perceived focal plane distances aligned with one or more real objects in view of the user; wherein each of said at least one image projectors comprises an electrically adjustable optical element to modulate the focal plane distances through a sequence that matches the visual distances of the generated image to the user at a rate sufficient to merge images in the visual perception of the user to simulate a light field.

2. The head mounted display system of claim 1, wherein each focal distance of the projected planes in the sequence is selected to achieve accommodation to vergence expected at said distance.

3. The head mounted display system of claim 1, where said focal plane of each image is varied in a sequence having at least three different focal distances and a rate selected to appear to a user to be simultaneous.

4. The projected head mounted display system of claim 1, wherein said electrically adjustable optical element comprises an electrically adjustable lens.

5. The projected head mounted display system of claim 1, wherein said electrically adjustable lens comprise at least one of an electrowetting lens and a deformable lens element.

6. The projected head mounted display system of claim 1, wherein said electrically adjustable optical element comprises an adjustable reflective element.

7. The projected head mounted display system of claim 6, wherein said adjustable reflective element comprises a deformable mirror.

8. The projected head mounted display system of claim 1, wherein said electrically adjustable optical element comprises one or more motorized lens elements.

9. The projected head mounted display system of claim 1, wherein said electrically adjustable optical element comprises one or more controllable diffraction elements.

10. The projected head mounted display system of claim 1, wherein said electrically adjustable optical element comprises one or more lens elements, said lens elements having an electrically controllable index of refraction.

11. The electrically adjustable optical element of claim 1, wherein said electrically adjustable optical element comprises surface acoustic wave optics.

12. The projected head mounted display system of claim 1 wherein said head mounted display further comprises a tracking module to track the movement and position of a user and includes a module to precompensate said projected images for imperfections in said retroreflective surface based on angle of incidence data from said tracking module.

13. A method of displaying visual images with a plurality of focal planes comprising:
   a) providing a head mounted frame with one or more image projectors arranged to project images out of and forward away from, said frame, said projector or projectors having an electrically adjustable focal plane distance of projected images;
   b) providing a retroreflective screen or retroreflective surface, said retroreflective screen or retroreflective surface having an effectively high ratio of retroreflected rays to diffused reflected rays so as to display images over said adjustable focal plane distance, by return of projected images from said image projectors to the eyes of a user;
   c) tracking the movement and position of a user and providing tracking data to a computing element to produce computer generated images (CGI) of objects having positions or perceived focal plane distances aligned with one or more real objects in view of the user; and
   d) stepping the focal plane distances through a sequence that matches the visual distances of the generated image to the user at a rate sufficient to merge images in the visual perception of the user to simulate a light field.

14. The method of claim 13, where said step of stepping through the focal plane is repeated for a plurality of computer generated images.

15. The method of claim 13, further comprising correcting for projection lens chromatic aberration.

16. The method of claim 13, wherein said providing includes providing two image projectors presenting stereo vision images to the user wherein the expected vergence for at least one part of said images presented at each focal plane distance converges at that plane.

17. The method of claim 13, further comprising tracking at least one of the head position and eye position of said user.

18. The method of claim 17, further comprising modifying said projected images to precompensate for imperfections in said retroreflective screen based on said one of the head position and eye position of said user.

19. The method of claim 16, wherein the image is an augmented reality image.

* * * * *